United States Patent [19]
Heer

[11] Patent Number: 6,089,530
[45] Date of Patent: Jul. 18, 2000

[54] GATE VALVE

[76] Inventor: Henry A. Heer, P.O. Box 1013, Paso Robles, Calif. 93446

[21] Appl. No.: 09/103,348

[22] Filed: Jun. 23, 1998

[51] Int. Cl.[7] .................................................. F16K 51/00
[52] U.S. Cl. ........................... 251/58; 251/145; 251/279; 251/300; 138/92
[58] Field of Search ................................ 251/145, 58, 62, 251/279, 343, 299, 300, 326; 138/92

[56] References Cited

U.S. PATENT DOCUMENTS

| | | | |
|---|---|---|---|
| 465,936 | 12/1891 | Libbey | 138/92 |
| 611,569 | 9/1898 | Duckham | 138/92 X |
| 671,153 | 4/1901 | Weihe | 251/145 X |
| 906,989 | 12/1908 | Aycock | 138/92 |
| 971,458 | 9/1910 | McCleary | 251/145 |
| 2,021,108 | 11/1935 | Longenecker | 138/92 |
| 2,610,780 | 9/1952 | Bledsoe | 251/343 X |
| 2,630,999 | 3/1953 | Lee | 251/343 |
| 2,647,539 | 8/1953 | Stearns | 251/145 |
| 3,185,434 | 5/1965 | Bozich | 251/145 X |
| 3,762,433 | 10/1973 | Moore | 137/494 X |
| 4,437,646 | 3/1984 | Bigelow et al. | 251/145 |
| 4,574,989 | 3/1986 | Pole | 222/486 |
| 4,762,666 | 8/1988 | Chang et al. | 376/264 |
| 5,033,608 | 7/1991 | Lorimor et al. | 198/674 |
| 5,577,707 | 11/1996 | Brida | 251/159 |

*Primary Examiner*—Stephen M. Hepperle
*Assistant Examiner*—John Bastianelli
*Attorney, Agent, or Firm*—Christie, Parker & Hale, LLP

[57] ABSTRACT

A swing gate valve for closing a lateral discharge opening in an elongated conduit includes a swing gate shaped to fit around the exterior of the conduit in an open position adjacent the lateral opening. A pair of pivotable swing arms are connected to the swing gate on opposite sides of the conduit, and are operated by an air ram to swing the gate to move it to a closed position over the discharge opening to an open position.

14 Claims, 5 Drawing Sheets

GATE VALVE

FIELD OF INVENTION

This invention relates to gate valves for controlling the movement of solid materials through elongated conduits.

BACKGROUND OF INVENTION

Gate valves have been used for many years to control the flow of solid particles or pieces through elongated conduits which have lateral openings through which material is permitted to flow from time to time down through a hopper, which converges to a throat where a conventional gate valve regulates flow of material through the hopper. In a typical installation, a rotatable auger screw moves product through the elongated conduit, which is often an upwardly opening U-shaped trough with lateral discharge openings spaced longitudinally so material can be dropped into hoppers at different locations. A separate gate valve in the hopper at each lateral discharge opening is opened and closed from time to time to achieve desired distribution of the product. Some solid materials tend to form clumps, especially during the period when the gate valve is closed, which obstruct the flow of material down through the hopper when the gate is subsequently opened. Those troublesome materials include fruit products, such as grapes, and cohesive powdered materials, such as cement, fertilizer, and the like.

The gate valves used in the past to control the flow of materials suffer from the following disadvantages:

1. They are expensive, and are difficult to maintain and repair;
2. They are mounted in a way that promotes clumping of material, and prevents visual inspection to ensure satisfactory operation; and
3. They require disassembly when blockage occurs, causing expensive, time-consuming interruption of production.

SUMMARY OF THE INVENTION

This invention provides an improved gate valve (and an improved valve gate) which reduces the tendency for materials to clump, is relatively inexpensive, easy to maintain, permits visual inspection during operation, and can be quickly and easily cleaned when necessary, with minimum interruption of production.

In brief, one form of the valve of this invention includes an elongated conduit through which material can move longitudinally. The lower portion of the conduit has a lateral discharge opening, and a valve gate is shaped to fit around the exterior of the conduit in an open position adjacent the lateral discharge opening. A valve gate drive moves the valve gate from the open position to a closed position where the valve gate fits snugly around the discharge opening to close that opening against movement of material down through it. The valve gate drive also moves the valve gate from the closed to the open position so material can move laterally down through the opening.

In the preferred form of the invention, the conduit is an elongated, substantially horizontal and upwardly opening U-shaped trough in which a conventional auger is mounted to rotate about a longitudinal axis and move solid material through the conduit. The valve gate is secured under the conduit to the lower ends of a pair of upwardly extending swing arms mounted on opposite sides of the longitudinal axis of the conduit. The upper ends of the swing arms are mounted to pivot about an axis transverse to the conduit. Means are provided for pivoting the swing arms to move the valve gate from the open to the closed position, and for pivoting the swing arms to move the gate from the closed to the open position. Preferably, the pivot axis for the upper ends of the arms is horizontal, above the longitudinal axis of the conduit, and between the open and closed positions so when the valve gate is carried by the arms toward the closed position, the valve gate swings through a slight arc, which causes the swing gate to be forced snugly against the conduit. When the valve gate moves from the open to the closed position, it swings through the same arc, but in the opposite direction, which causes the valve gate to move slightly away from the conduit as the valve gate begins to move longitudinally. This movement minimizes sliding and dragging of the valve gate against the conduit as the gate moves into and away from the closed position, thereby extending the life of the equipment. Preferably, the interior surface of the gate (i.e, the portion of the gate which faces the conduit) is lined with an elastomeric material to make a good seal around the lateral discharge opening in the conduit. The slight arcuate movement just described for the valve gate minimizes wear and tear on the elastomeric sheet.

DESCRIPTION OF THE PREFERRED EMBODIMENT

Figure 1:
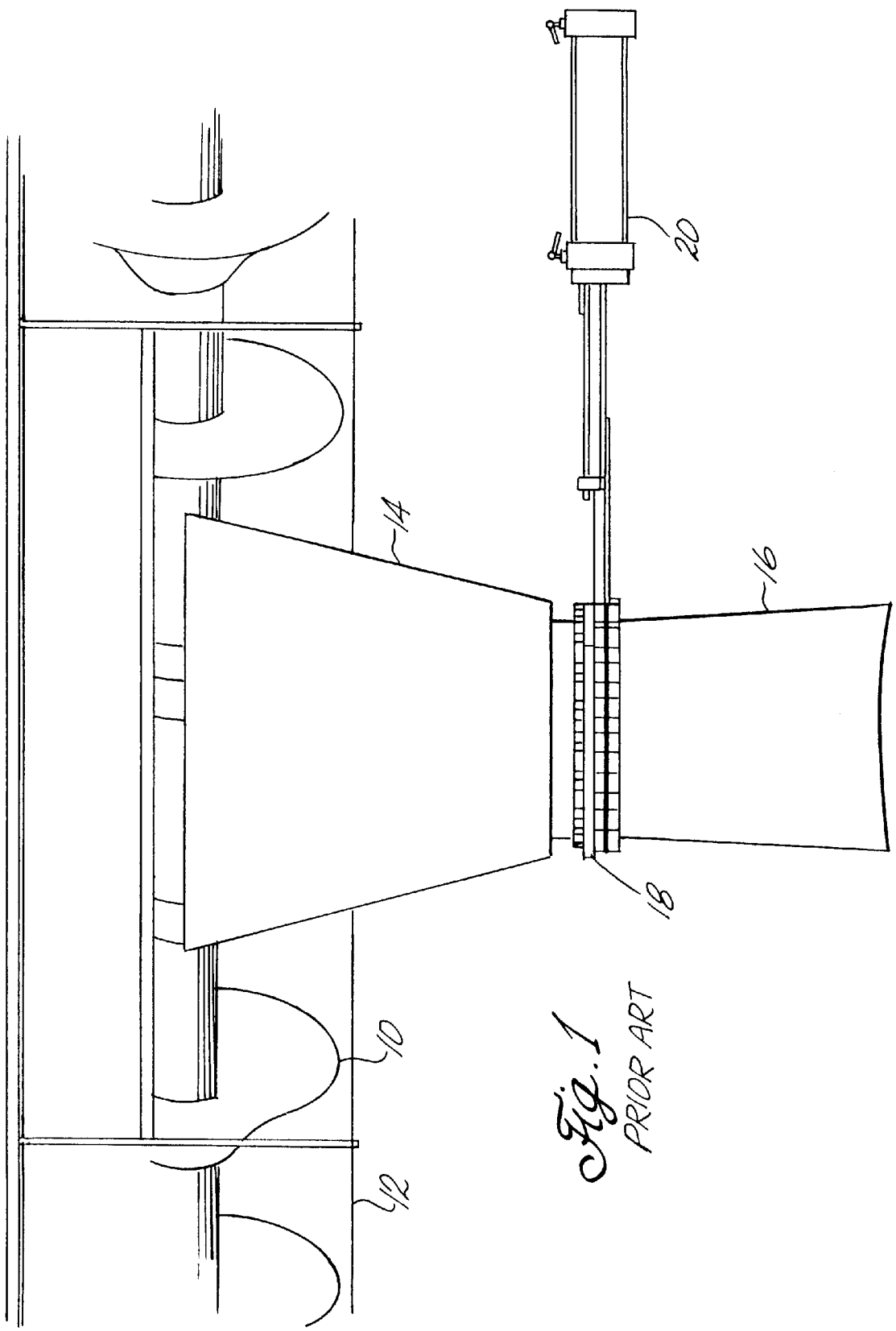
FIG. 1 is an elevation of a prior art installation of a conventional gate valve used to control flow of material from a conduit down through a hopper connected to the upper side of the gate valve.

The advantages of the present invention can be more easily understood by referring to FIG. 1, which shows a prior art gate valve arrangement for a typical winery in which freshly picked grapes (not shown) are moved by an auger 10 rotating about a horizontal longitudinal axis within an upwardly opening U-shaped trough 12, which at various intervals includes a downwardly converging hopper 14 secured at its upper end around a lateral opening (not shown) in the trough so that grapes may flow downwardly into a chute 16 connected at its upper end through a gate valve 18 to the lower end of the hopper. The gate valve is operated by a conventional air ram 20, which can move a gate (not shown) between open and closed positions to control the flow of grapes down to the hopper and into the chute. When the gate valve is closed, grapes sometimes pack into the lower end of the hopper, and form an obstruction which prevents flow of grapes down into the chute when the gate valve is subsequently opened. When an obstruction occurs, the gate valve must be disassembled to remove the obstruction. This is time consuming, and interrupts valuable production, which preferably continues 24 hours a day during the harvest season for the grapes. Moreover, with the prior art arrangement shown in FIG. 1, the hopper and chute obscure visual inspection to determine whether or not grapes are flowing properly from the trough when the conventional gate valve is in the open position.

Figure 2:
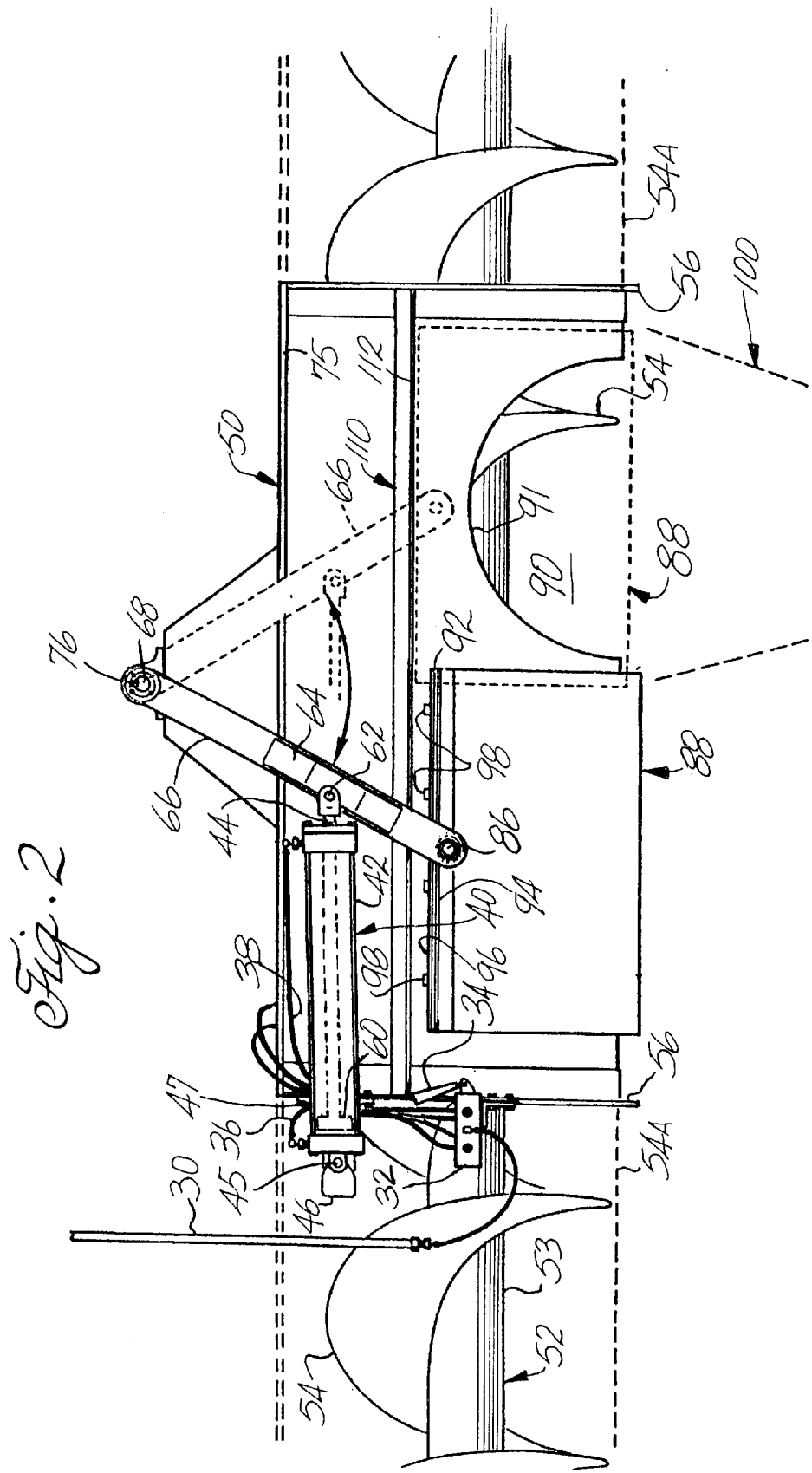
FIG. 2 is a right side elevation of the preferred embodiment of the invention.
Figure 3:
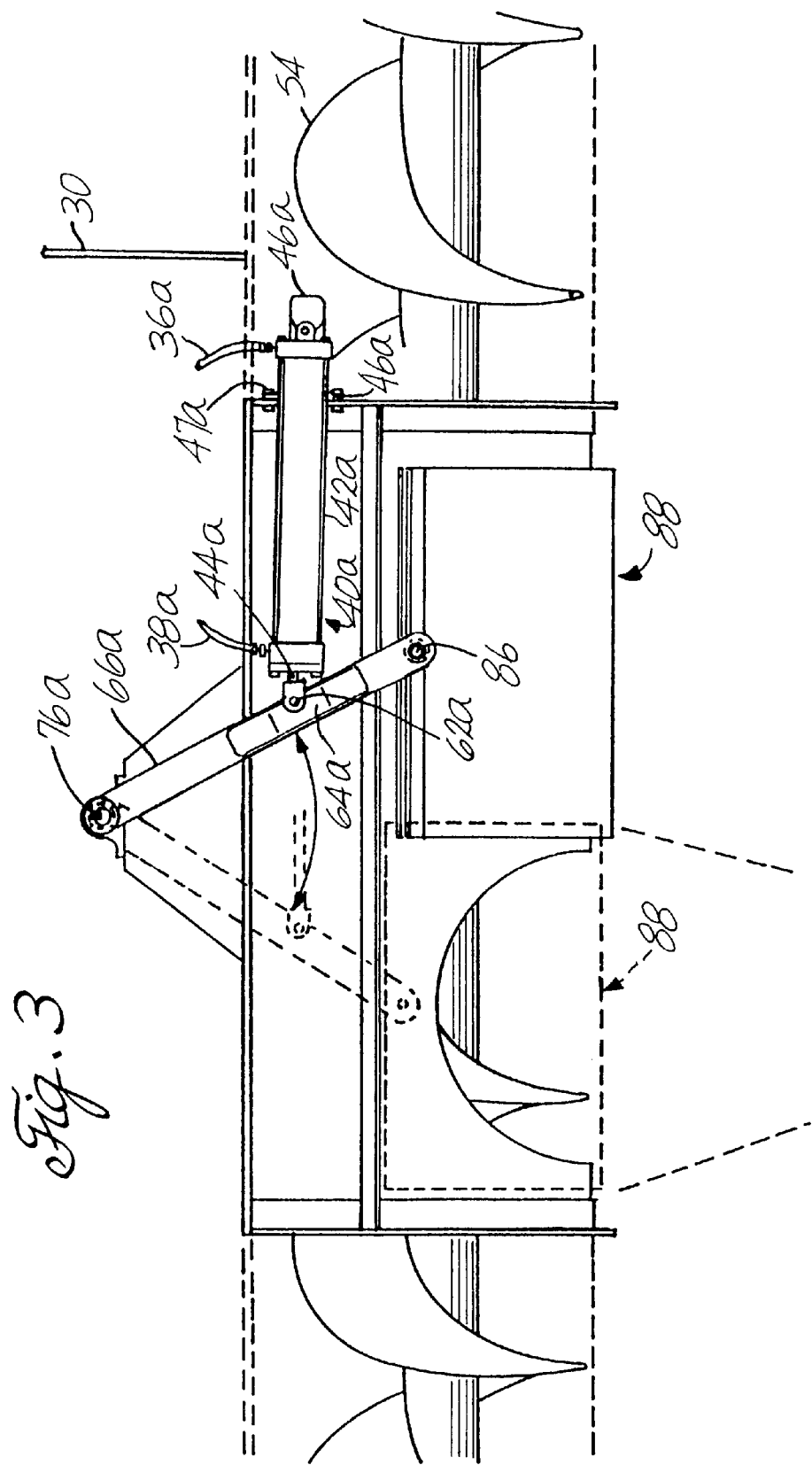
FIG. 3 is a left side elevation of the preferred embodiment of the invention.
Figure 4:
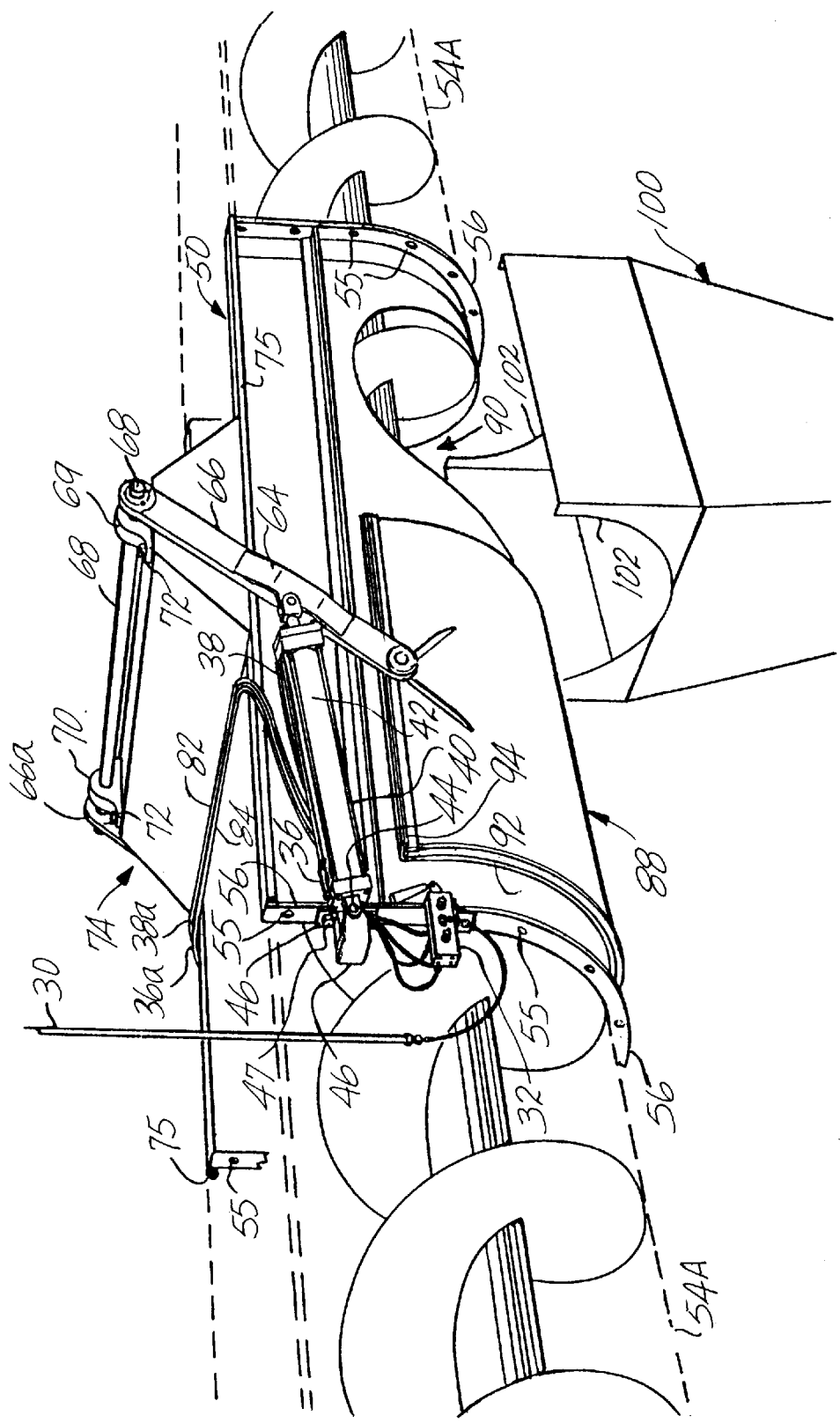
FIG. 4 is a perspective view, partly broken away, showing a view similar to that of FIG. 2.

Referring to FIGS. 2, 3 and 4, which show a preferred embodiment of the present invention, a valve gate drive 28 includes compressed air supplied through an air supply line 30 to a conventional actuator valve 32, which includes a control handle 34.

Referring to FIGS. 2 and 4, which show the right sides of the embodiment, rear and forward control hoses 36 and 38, respectively, connect the respective rear and forward ends of a right air ram 40 to the actuator valve 32. The right air ram includes a cylinder 42, and a piston rod 44. The rear end of the right air ram cylinder is connected by a horizontal transverse pivot pin 45 to a bracket 46 secured by bolts 47 to the rear end of the right side of an upwardly opening U-shaped horizontal trough section 50, which forms an elongated conduit through which product, such as grapes, can be moved horizontally by a conventional auger screw 52, which includes a conventional elongated longitudinally extending drive shaft 53, on which is mounted an auger blade 54.

Referring to FIG. 4, the trough section 50 is secured between adjacent conventional trough sections 54A (shown only in phantom line) by bolts (not shown) extending longitudinally through bolt holes 55 in U-shaped vertical flanges 56 on each end of the trough sections. As shown best in FIG. 4, the bracket 46 at the rear end of the right air ram is secured by the bolts 47 to the rear vertical flange 56 of the trough section 50. For clarity, the forward flange of the adjacent trough section to the rear of trough section 50 is not shown, but that forward flange is sandwiched between the bracket 46 and the rear flange of trough section 50.

The auger screw rotates so product in the trough is moved from left to right as viewed in FIGS. 2 and 4. Accordingly, the right end of the trough section 50 shown in FIGS. 2, and 4 is the forward end of the apparatus.

The rear end of the piston rod 44 is connected to a conventional piston 60 in the right air ram cylinder. The forward end of the piston rod 44 is connected by a horizontal transverse pivot pin to a bracket 64 mounted on an intermediate portion of an upwardly extending swing arm 66 secured at its upper end to the right end of a horizontal transverse axle 68 journaled through right and left bearings 69, 70, respectively, mounted by bolts 72 to the upper surface of a transverse horizontal bridge 74 welded to right and left outwardly extending longitudinal flanges 75 on respective upper right and left edges of the trough section 50. The right end of the axle 68 is secured by a key 76 to the upper end of the right swing arm so the axle and swing arm must turn together.

As shown in FIG. 3, a left swing arm 66a is mounted with a key 76a on the left end of the axle 68, and is connected between its ends (as described above for the right swing arm) through a bracket 64a and a horizontal and transverse pivot pin 62a to the forward end of a piston rod 44a in a left air ram 40a on the left side of the trough. A piston 60a is connected to the rear end of the rod 44a in the left air ram, which is supplied air from the actuator valve 32 through a rear control hose 36a and a forward control hose 38a. The rear end of the air ram is connected by transverse and horizontal pivot pin 45a to a bracket 46a secured by bolts 47a to the rear flange 56 on the trough section 50. The actuator valve includes conventional exhaust ports (not shown) in which are mounted adjustable needle valves (not shown) used to control the rate air is expelled from the air ram cylinder, and thus control the rate at which the swing arms and valve gate move between the open and closed positions. The pistons are moved back and forth within the cylinders by operation of the actuator valve in a manner well known to those skilled in the art.

The lower end of each swing arm is connected to a respective outwardly extending horizontal transverse pivot pin 86 welded at its inner end to the outside of an upper portion of a U-shaped swing gate 88, which makes a close fit around the lower half of the trough section 50. The swing gate 88 is about one-half the length of the trough section 50. The pivot pins 86 lie in a vertical plane close to the center of gravity of the swing gate, and the pins 86 are above the center of gravity of the gate. In the preferred form, the pins are slightly to the rear of the center of gravity of the swing gate so the gate tends to incline slightly downwardly in the forward direction to facilitate operation as described below.

Figure 5:
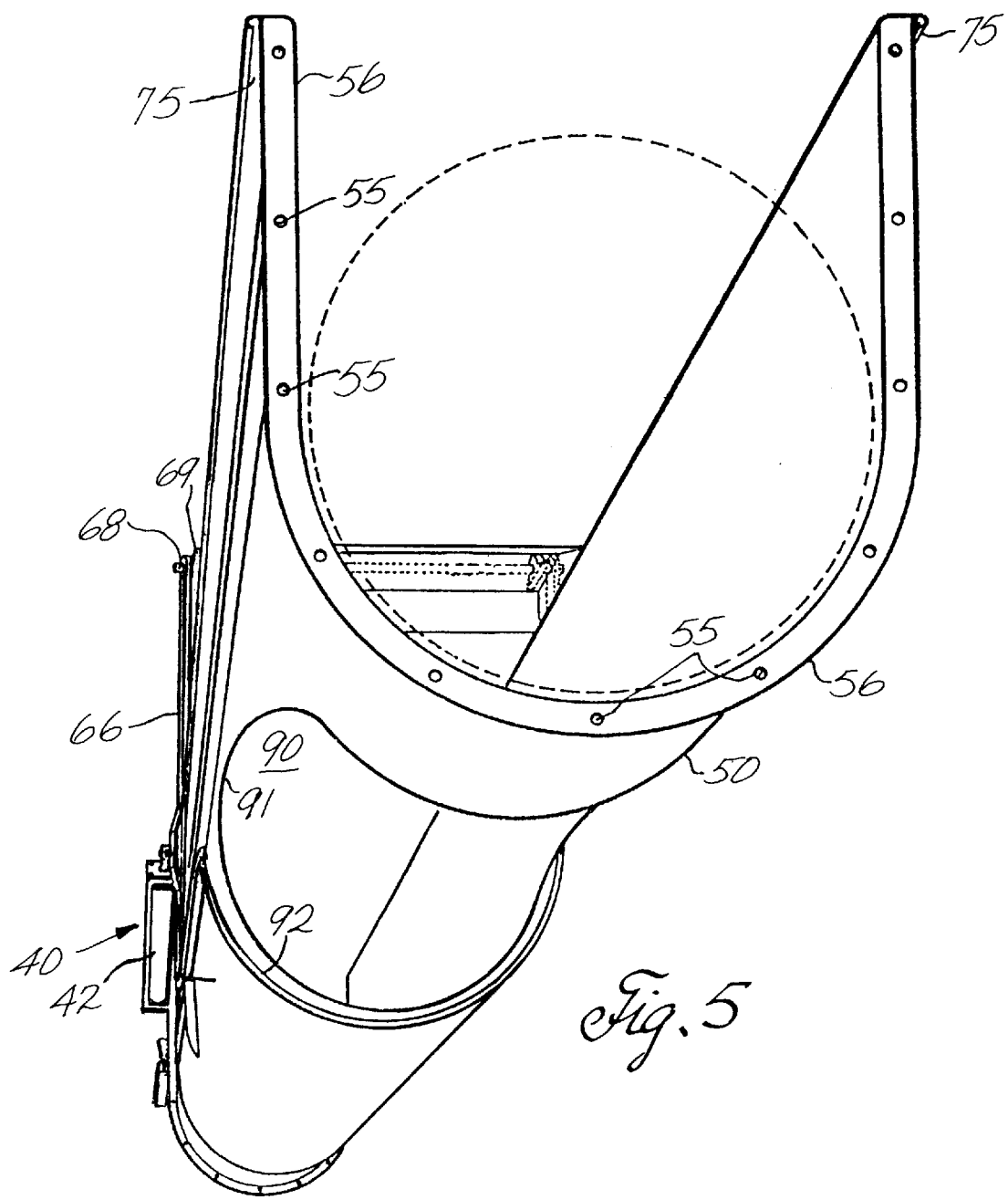
FIG. 5 is a perspective view of the underside of the preferred embodiment of the invention.

As shown in FIGS. 2, 3, and 4, the air rams are in the retracted position so the piston rods hold the swing gate in an open position with respect to a lateral discharge opening 90 formed in the lower portion of the trough section 50 just forward of the forward end of the swing gate. The discharge opening is symmetrical with respect to the longitudinal axis of the trough section 50, and has a downwardly facing concave edge on each side of the conduit trough 50. This gives the opening the shape shown in FIG. 5. As viewed in side elevation (FIGS. 2 & 3), each concave edge of discharge opening appears as a semicircle with a diameter collinear with the longitudinal bottom of the trough section 50.

When the actuator valve is operated to supply compressed air to the rear of the pistons in the air rams (and exhaust air forward of the piston through the exhaust ports in the actuator valve), the piston rods move forward to pivot the swing arms in a counter clockwise direction (as viewed in FIG. 2) from the solid line to the dotted line position. This moves the swing gate to a closed position over the lateral discharge opening 90 as indicated by the dotted line. As the swing arms move the swing gate toward the closed position, the gate moves longitudinally forward and slightly downwardly because of the arc traced by lower ends of the swing arms. The slight downward and forward incline of the gate referred to above ensures that the forward end of the gate moves without interference past the forward edge of the discharge opening. As the swing gate approaches the closed position shown in dotted line in FIGS. 2 and 3, the swing arms carry the gate upwardly at the end of its longitudinal travel so the swing gate fits as a saddle to make a tight fit against the exterior portion of the trough section 50 surrounding the lateral discharge opening 90. The trunnion-type connection between the gate and the lower ends of the swing arms permits the gate to pivot relative to the arms about a horizontal axis so the gate adjusts automatically into a snug fit against the section trough 50. To ensure a good seal, the concave (inner) surface of the swing gate is covered with a rectangular elastomeric sheet, or seal liner, 92 (FIGS. 4 and 5), the upper ends of which overlay a respective horizontal and longitudinally extending respective shelf 94 welded to each upper edge of the swing gate to extend outwardly from the gate. Each shelf 94 is preferably one side of a piece of angle iron welded to the upper edge of the swing gate. This not only provides the shelf for securing the seal liner in place, it also adds stiffness and strength to the swing gate. The seal liner is clamped in place by separate horizontal and longitudinally extending retainer straps 96 secured by bolts 98 to a respective shelf 94.

When the actuator valve is operated to apply compressed air to the forward sides of the pistons in the cylinder (and exhaust air from the rear sides of the pistons) the arms pivot in a clockwise direction (as viewed in FIG. 2) to move the valve gate from the closed to the open position. The arcuate motion followed by the gate as it moves into, or out of, the closed position minimizes sliding against the outside of the trough section, and extends the life of the seal liner.

Referring to FIG. 4, when the apparatus is in operation, a hopper 100 is mounted by conventional means (not shown) under the lateral discharge opening to receive product when the gate valve is open. The forward and rear edges of the upper end of the hopper each include an upwardly opening semi-circular recess 102 so the hopper can make a close fit with the trough section 50 in the vicinity of the lateral discharge opening. In the operating position, the hopper is located to leave sufficient clearance for the swing gate to move back and forth between the opened and closed positions, and to leave enough space for visual inspection to ascertain that product falls from the trough when the gate valve is open.

A separate horizontal and longitudinally extending stiffener and guide 110 in the shape of a piece of angle iron is welded to the outside of each side of the trough (section 50) to provide stiffness and an outwardly extending horizontal longitudinal guide 112 to limit movement of the swing gate beyond that normally desired. Accordingly, the lower respective surface of each guide is slightly above the respective upper edge of the valve gate when the gate is in the closed position shown in dotted lines in FIG. 2.

In the event of an obstruction, the problem is easily corrected by moving the swing gate to an intermediate location between the open and closed positions, say with the swing arms vertical. That provides ample access to the lateral discharge opening so it can be cleared of any obstruction. Moreover, the swing gate is at the point to provide maximum clearance between the gate and the adjacent trough section so that any obstructing material on the gate can also be removed. This position of the swing gate also makes it easy to wash the gate, the trough and the auger when normal cleaning or maintenance operations are required.

For handling food products, the elastomer used for the seal liner can be of any suitable food grade material such as buna-N rubber. In addition, the swing gate can be of any suitable size required to accommodate various troughs. In a typical installation, the trough section, swing gate, swing arms, and necessary accessories are made of stainless steel. In one installation, in which the auger screw had a 24 inch diameter, the trough section was about 5 feet, 8 inches long, the swing gate was about 2 feet, 6 inches long, and about 1 foot, 4 inches high. The swing arms were about 2 feet, 5 inches long, and the air ram had a diameter of about 4.25 inches. The clearance between the swing gate interior and the lower portion of the trough section when the swing arms are vertical is about 3 inches. The piston rods of the air rams were secured to the swing arms so the ratio of the distance between each rod pivot point and the corresponding lower pivot point of the respective swing arm to the distance between each rod pivot point and the corresponding upper pivot point of the respective swing arm was about 3:5. This insures good closing force on the swing gate.

In addition to the swing arm structure shown in FIGS. 2, 3, 4 and 5 for supporting and moving the swing gate, other equivalent arrangements can be used. For example, by making the components sturdy enough, one of the air rams can be omitted so that only one air ram is required to move the swing arms back and forth to operate the swing gate between the closed and open position. Alternatively, the axle can be provided with an upwardly extending lever in the center of the axle, and a single air ram can be mounted above the trough to push the lever back and forth to operate the swing arms as desired. In yet another embodiment, the upper portion of the swing gate can be provided with inwardly extending pins on the interior of each side of the swing gate to fit into appropriately shaped guide tracks on the right and left sides of trough section 50 to cause the swing gate to travel along a path similar to that described above in closing and opening the lateral discharge opening. In that case, the swing arms are omitted, and replaced by an appropriate drive for moving the swing gate longitudinally back and forth along the guide tracks.

I claim:

1. A valve for controlling the movement of material through a lateral discharge opening in an elongated conduit through which the material moves longitudinally, the valve comprising:

a valve gate shaped to fit around the exterior of the conduit in an open position adjacent the lateral opening; and a valve gate drive independent of pressure exerted by the material for moving the valve gate from the open position to a closed position where the valve gate makes a snug fit around the discharge opening to close the opening against movement of material through the opening, and means for moving the valve gate from the closed to the open position to permit material to move laterally through the opening.

2. A valve for controlling the movement of material through a lateral discharge opening in an elongated conduit through which the material moves longitudinally, the valve comprising:

a valve gate shaped to fit around the extension of the conduit in an open position adjacent the lateral opening;

an elongated swing arm secured at one end to the valve gate;

means securing the other end of the valve gate to pivot about an axis transverse to the conduit;

means for pivoting the swing arm to move the valve gate from the open position to a closed position where the valve gate makes a snug fit around the discharge opening to close the opening against movement of material through the opening; and means for pivoting the swing arm to move the valve gate from the closed to the open position to permit fluid to move laterally through the opening.

3. A valve according to claim 2 in which the swing arm is connected to the swing gate to pivot about an axis transverse to the conduit.

4. A valve according to claim 2 in which the elongated conduit is substantially horizontal and the discharge opening is in a lower portion of the conduit, and the pivot axis for the said other end of the swing arm is located above the point where the swing arm is connected to the valve gate.

5. Apparatus according to claim 1 in which the elongated conduit is substantially horizontal, and the valve gate drive includes a pair of swing arms mounted at their respective lower ends on opposite sides of the valve gate and at their respective upper ends to a transverse axle defining an axis about which the swing arms can pivot to move the valve gate back and forth between the open and closed positions.

6. Apparatus according to claim 5 in which the swing arms are each mounted at their respective lower ends to pivot with respect to the valve gate about a transverse axis.

7. Apparatus according to claim 5 in which the swing arms are rigidly secured to the axle so the swing arms are prevented from rotating relative to the axle.

8. Apparatus according to claim 3 in which the elongated conduit is substantially horizontal and the discharge opening is in a lower portion of the conduit, the swing arm extending upwardly from the gate, and the means for pivoting the swing arm is an air ram pivotally connected at one end to the swing arm between the two ends of the swing arm, and at the other end to pivot about a point fixed relative to the swing arms, and means for supplying air under pressure to the ram to cause the swing arms to pivot back and forth about a transverse axis to move the valve gate between the open and the closed position.

9. Apparatus according to claim 1 or 2 which includes an elastomeric sheet on the valve gate between the valve gate and the conduit so the elastomeric sheet aids in making a tight seal around the discharge opening when the valve gate is in the closed position.

10. Apparatus according to claim 9 which includes means for removably securing the liner sheet to the gate.

11. A valve gate for closing a lateral opening in an elongated conduit having a curved exterior, the gate comprising:

a body curved around a longitudinal axis to fit around the exterior of the conduit and cover the lateral opening; and a pair of pivot pins on the body on opposite sides of the longitudinal axis for securing the gate to swing arms mounted adjacent the conduit, the pivot pins being in a plane substantially perpendicular to the longitudinal axis and close to the center of gravity of the body.

12. Apparatus according to claim 11 which includes an elastomeric sheet removably secured to the concave side of the body to make a snug fit against the conduit when the valve gate is positioned to close the lateral opening.

13. A method for operating a valve which includes:

an elongated conduit through which material can move longitudinally, the conduit having a lateral discharge opening;

a valve gate shaped to fit around the exterior of the conduit in an open position adjacent the lateral opening;

the valve gate being movable from the open position to a closed position where the valve gate fits snugly around the discharge opening to close the opening against movement of material;

the method including the steps of moving the valve gate laterally and longitudinally from the closed to the open position so material can move laterally through the opening; and moving the valve gate longitudinally and laterally to fit snugly around the discharge opening and prevent material from moving laterally through the opening.

14. Apparatus according to claims 2, 3, 5, 6, 7 or 8 which includes at least one longitudinally extending guide on the exterior of the conduit for limiting the pivoting action of the valve gate as it moves between the closed and open positions.

\* \* \* \* \*